(12) United States Patent
Krankkala et al.

(10) Patent No.: US 9,010,856 B2
(45) Date of Patent: Apr. 21, 2015

(54) AUTOMOBILE BENCH SEAT COVER

(71) Applicant: Bell Automotive Products, Inc., Scottsdale, AZ (US)

(72) Inventors: Ken Krankkala, Anthem, AZ (US); Danielle Peters, Mesa, AZ (US); Joleen Jansen, Omaha, NE (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 0 days.

(21) Appl. No.: 14/022,075

(22) Filed: Sep. 9, 2013

(65) Prior Publication Data

US 2015/0069803 A1 Mar. 12, 2015

(51) Int. Cl.
*A47C 31/00* (2006.01)
*B60N 2/60* (2006.01)

(52) U.S. Cl.
CPC .............. *B60N 2/6063* (2013.01); *B60N 2/60* (2013.01)

(58) Field of Classification Search
CPC ....... B60N 2/6027; B60N 2/6063; B60N 2/60
USPC .............. 297/219.1, 224, 228.1, 228.11, 229
See application file for complete search history.

(56) References Cited

U.S. PATENT DOCUMENTS

| | | | | |
|---|---|---|---|---|
| 4,134,616 A * | 1/1979 | Christensen | ............... | 297/188.2 |
| 4,540,216 A * | 9/1985 | Hassel, Sr. | ..................... | 297/238 |
| 5,139,311 A * | 8/1992 | Imai et al. | ..................... | 297/481 |
| 5,158,339 A * | 10/1992 | Miyanaga | ..................... | 297/482 |
| 5,320,407 A * | 6/1994 | Tell | ..................... | 297/228.11 |
| 5,330,251 A * | 7/1994 | McGuire | ..................... | 297/229 |
| 5,529,376 A * | 6/1996 | Jovan et al. | ..................... | 297/257 |
| 5,911,476 A * | 6/1999 | Horn | ..................... | 297/229 |
| 6,412,876 B2 * | 7/2002 | Nishide | ..................... | 297/482 |
| 6,533,320 B1 * | 3/2003 | Langensiepen et al. | ... | 280/801.1 |
| 6,722,733 B2 * | 4/2004 | Schmidt et al. | ............... | 297/229 |
| 7,192,086 B2 * | 3/2007 | Davis et al. | ..................... | 297/219.12 |
| 7,261,375 B2 * | 8/2007 | Godshaw et al. | ........ | 297/228.12 |
| 7,410,213 B1 * | 8/2008 | Ferrari-Cicero et al. | | 297/219.12 |
| 7,699,396 B2 * | 4/2010 | Ghisoni et al. | ................. | 297/253 |
| 7,931,335 B1 * | 4/2011 | Siklosi et al. | ................. | 297/229 |
| 8,434,828 B2 * | 5/2013 | Arata et al. | ..................... | 297/481 |
| 2004/0130193 A1 * | 7/2004 | Haller | ..................... | 297/229 |
| 2005/0110315 A1 * | 5/2005 | Littlehorn et al. | ........ | 297/219.12 |
| 2007/0040426 A1 * | 2/2007 | Kenny | ..................... | 297/229 |
| 2008/0179926 A1 * | 7/2008 | Kushner | ..................... | 297/220 |
| 2011/0049951 A1 * | 3/2011 | Bettencourt | ................. | 297/229 |

FOREIGN PATENT DOCUMENTS

DE 9213984 * 12/1992
GB 2257356 A * 1/1993 ............. A47C 31/11

* cited by examiner

*Primary Examiner* — Laurie Cranmer
(74) *Attorney, Agent, or Firm* — Booth Udall Fuller, PLC

(57) ABSTRACT

An automobile bench seat cover having a bottom portion and a back portion is disclosed herein. The bottom portion is configured to cover three seat bottoms of a bench seat when removably coupled to the automobile bench seat. The back portion is coupled to the bottom portion and configured to cover three seatbacks of the bench seat when removably coupled to the bench seat. The bench seat cover also includes two slits extending from a top portion of the back portion toward the bottom portion. Each slit is adaptable between an open position that allows a seatbelt to fit through the slit and a closed position that closes the slit. One or more couplings, such as Velcro, are positioned adjacent each of the two slits and configured to close the respective slit.

6 Claims, 3 Drawing Sheets

AUTOMOBILE BENCH SEAT COVER

BACKGROUND

1. Technical Field

Aspects of this document relate generally to automobile seat covers.

2. Background Art

Automobile seat covers are widely used by consumers to protect the automobile seats and enhance the comfort of the seat and overall driving experience. Conventional seat covers, however, are typically configured to cover only one seat—such as the driver or passenger seat.

SUMMARY

According to one aspect, an automobile bench seat cover comprises a bottom portion and a back portion. The bottom portion comprises a first bottom portion configured to position over a first seat bottom, a second bottom portion configured to position over a second seat bottom, and a third bottom portion configured to position over a third seat bottom. The back portion is coupled to the bottom portion and comprises a first back portion configured to position over a first seatback; a second back portion adjacent the first back portion and configured to position over a second seatback; a third back portion adjacent the second back portion and configured to position over a third seatback; one or more first couplings positioned adjacent the first slit and configured to removably couple the first back portion to the second back portion when the first slit is in the closed position; a first slit extending from a top of the back portion toward the bottom portion and operable between an open position that allows a seatbelt to extend therethrough and a closed position closes the first slit, the first slit dividing the first back portion from the second back portion; a second slit extending from the top of the back portion toward the bottom portion and operable between an open position that allows a seatbelt to extend therethrough and a closed position that closes the second slit, the second slit dividing the second back portion from the third back portion, wherein at least one of the first and second slits is positioned to align with a seatbelt of an automobile bench seat, and one or more second couplings positioned adjacent the second slit and configured to removably couple the second back portion to the third back portion when the second slit is in the closed position.

Various implementations and embodiments may comprise one or more of the following. The one or more first couplings and the one or more second couplings may each comprise hook and loop fastening material. A first seatbelt receiver opening positioned proximate an intersection of the back portion and the bottom portion and aligned with the first slit, wherein the first slit extends from the top portion of the back portion to the first seatbelt receiver opening. A second seatbelt receiver opening positioned proximate the intersection of the back portion and the bottom portion and aligned with the second slit, wherein the second slit extends from the top portion of the back portion to the second seatbelt receiver opening. One or more headrest openings positioned on the top portion of the back portion. An elastic strip on the bottom portion configured to stretch around portions of the first, second, and third seat bottoms to removably couple the bottom portion of the seat cover to the first, second, and third seat bottoms. An elastic strip on the back portion configured to stretch around portions of the first, second, and third seatbacks to removably couple the back portion of the seat cover to the first, second, and third seatbacks.

According to another aspect, an automobile bench seat cover comprises a bottom portion and a back portion. The bottom portion is configured to cover three seat bottoms of an automobile bench seat when removably coupled to the automobile bench seat and comprises an elastic base configured to stretch around a portion of the three seat bottoms to removably couple the bottom portion to the automobile bench seat. The back portion is coupled to the bottom portion and configured to cover three seatbacks of the automobile bench seat when removably coupled to the automobile bench seat. The back portion comprises an elastic strip configured to stretch around a portion of the three seatbacks to removably couple the back portion to the automobile bench seat. One or more slits extend from a top portion of the back portion towards the bottom portion, each of the one or more slits being positioned between two of the three seatbacks and adaptable between an open position that allows a seatbelt to fit through the slit and a closed position that closes the slit. One or more couplings are positioned adjacent each of the one or more slits and configured to close the one or more slits.

Various implementations and embodiments may comprise one or more of the following. The one or more couplings are positioned adjacent each of the one or more slits and comprise hook and loop fastening material. One or more headrest openings positioned on the top portion of the back portion. The one or more slits may comprise two slits. Two seatbelt receiver openings may each be positioned proximate an intersection of the bottom portion and the back portion.

According to another aspect, a method of removably coupling a bench seat cover to an automobile bench seat comprises stretching an elastic base of a bottom portion of the bench seat cover at least partially around a first, second, and third seat bottom of the automobile bench seat to cover the first, second, and third seat bottoms with the bottom portion of the bench seat cover; stretching an elastic strip of a back portion of the bench seat cover at least partially around a first, second, and third seatback of the automobile bench seat to cover the first, second, and third seatbacks with the back portion of the seatback cover; opening a slit extending from the top portion of the back portion toward the bottom portion, the slit being positioned between the first seatback and the second seatback; pulling a seatbelt through the opened slit; and closing the opened slit.

Various implementations and embodiments may comprise one or more of the following. Pulling two or more seatbelt receivers through two seatbelt receiver openings positioned proximate an intersection of the back portion and the bottom portion. Closing the opened slit may comprise closing the open slit with hook and loop fastening material. Extending one or more headrests through one or more headrest openings positioned on the top portion of the back portion.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended automobile bench seat cover and/or assembly procedures for an automobile bench seat cover will become apparent for use with implementations of automobile bench seat covers from this disclosure. Accordingly, for example, although particular automobile bench seat covers are disclosed, such automobile bench seat covers and implementing components may comprise any shape, size, style, type, model, version, measurement, concentration, material, quantity, and/or the like as is known in the art for such automobile bench seat covers and implementing components, consistent with the intended operation of automobile bench seat covers.

Conventional seat covers are typically configured to cover only single driver or passenger seats in an automobile. Conventional seat covers also typically prohibit passage of a seatbelt through the seat cover. In some cases where the seatback cover and the seat bottom cover are separate, a seat cover can be installed as long as it doesn't go over the top of the seat or the user cuts the seat cover to allow it to wrap around without interfering with the seatbelt. Some manufacturers even instruct users to cut the seat cover by themselves enable the seat cover to install on to a seat around the seatbelt. As shall be described in greater detail below, various embodiments of the automobile bench seat cover contemplated and disclosed herein solve this problem by removably coupling to a bench seat of an automobile and allowing passage of seatbelt therethrough.

Figure 3:
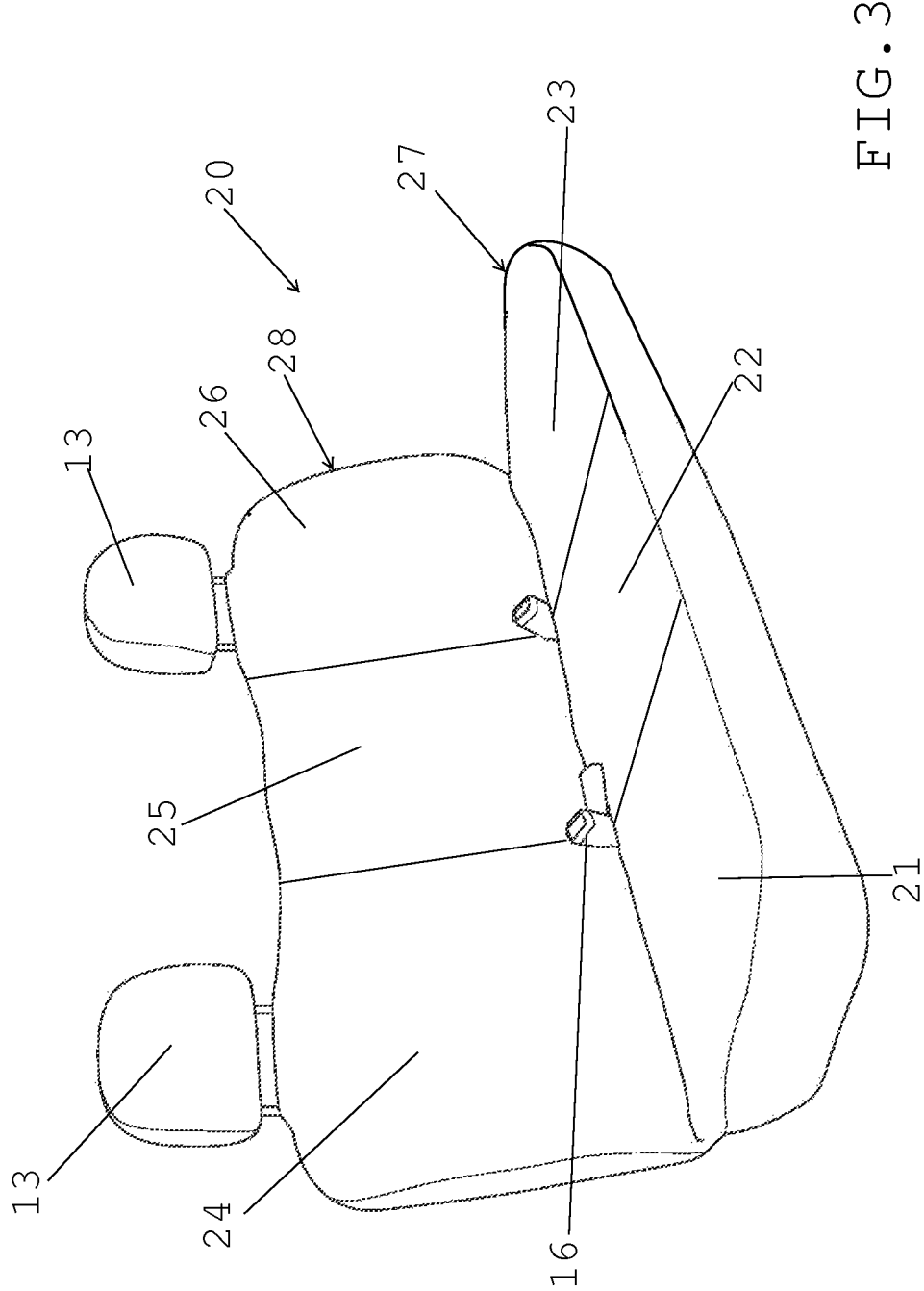
FIG. 3 is a perspective view of an automobile bench seat.

FIG. 3 depicts an exemplary automobile bench seat 20, although it is intended that any reference to an automobile bench seat 20 made herein is intended include any automobile bench seat known in the art. Typically an automobile bench seat 20 comprises a bench seat bottom 27 comprising a first seat bottom 21, a second seat bottom 22, and a third seat bottom 23. Automobile bench seats 20 typically further comprise a bench seatback 28 comprising a first seatback 24, a second seatback 25, and a third seatback 26. A plurality of seatbelt receivers 16, typically three seatbelt receivers 16, extend out from between the bench seat bottom 27 and the bench seatback 28. A plurality of headrests 13 are also typically coupled to the bench seatback 28.

Figure 1:
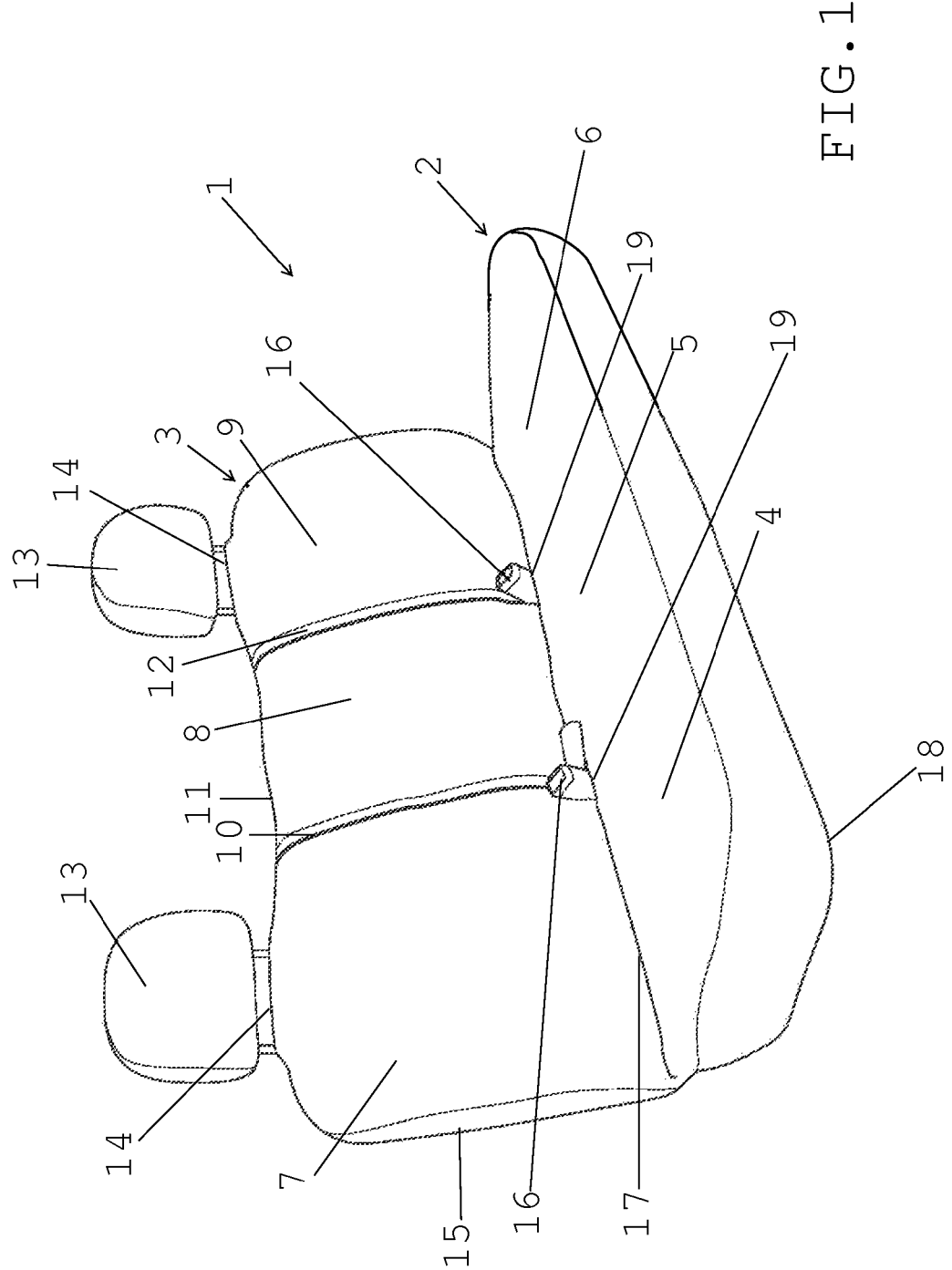
FIG. 1 is a perspective view of a bench seat cover on a bench seat with slits through the back portion closed to cover the seatbelts.
Figure 2:
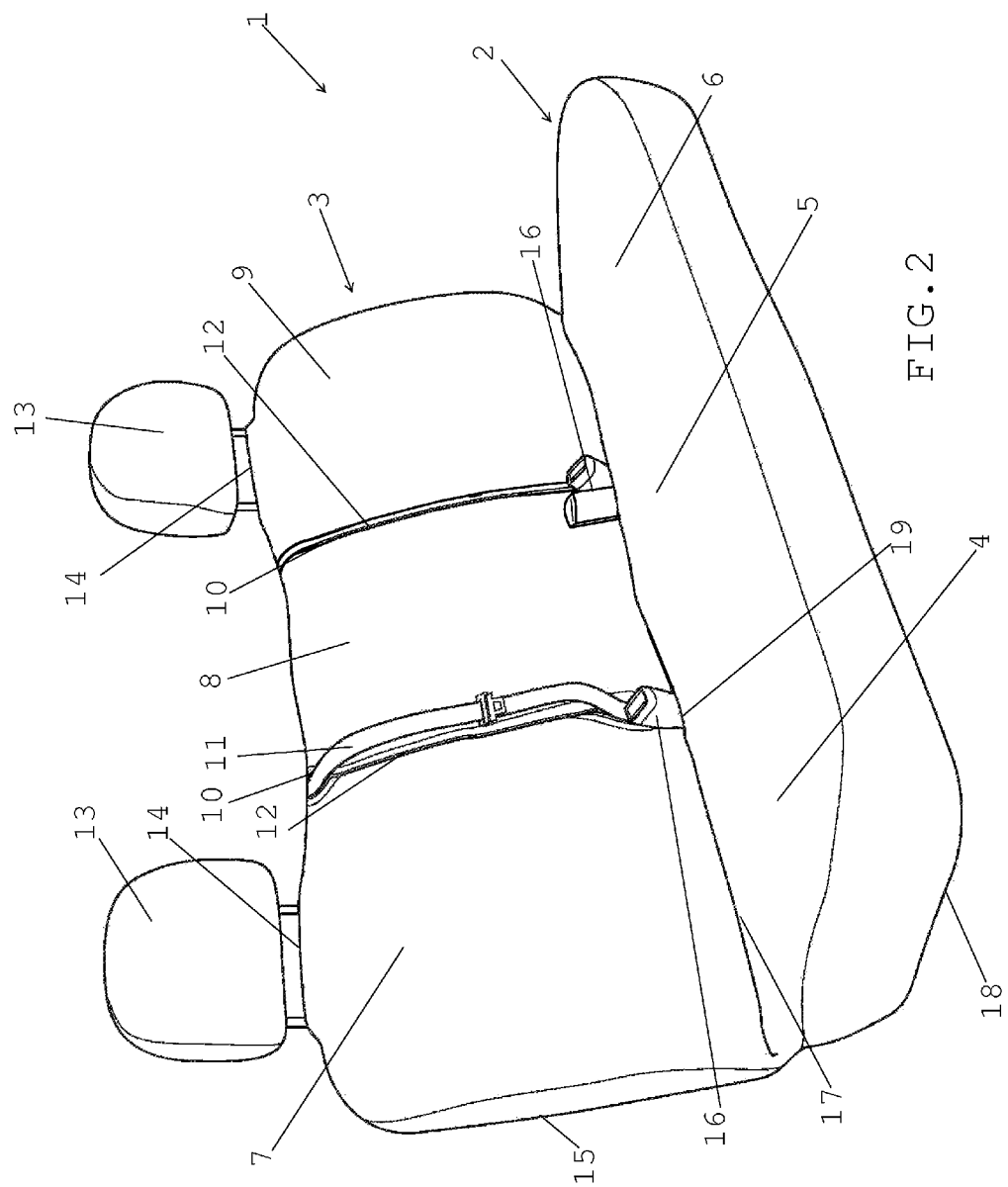
FIG. 2 is a perspective view of a bench seat cover on a bench seat with a seatbelt extending through one of the slits of the back portion.

FIGS. 1 and 2 depict an exemplary embodiment of a bench seat cover 1 removably coupled to an automobile bench seat 20. In one or more embodiments, a bench seat cover 1 comprises a bottom portion 2 and a back portion 3. The bottom portion 2 is sized and configured to cover the bench seat bottom 27 of an automobile bench seat 20. More specifically, the bottom portion 2 of the bench seat cover 1 comprises a first bottom portion 4 configured to cover or position over the first seat bottom 21, a second bottom portion 5 configured to cover or position over the second seat bottom 22, and a third bottom portion 6 configured to cover or position over the third seat bottom 23 when the bench seat cover 1 is removably coupled to an automobile bench seat 20.

One or more embodiments of a bench seat cover 1 further comprise an elastic base 18 coupled to the bottom portion 2 and configured to at least partially surround the bench seat bottom 27 of the automobile bench seat 20 when coupled thereto. In a particular embodiment, the elastic base 18 extends from a side of the first seat bottom 21, across the front of the first seat bottom 21, the second seat bottom 22, and the third seat bottom 23, to a side of the third seat bottom 23. Accordingly, the elastic base 18 typically extends from the first bottom portion 4 to the second bottom portion 5, and from the second bottom portion 5 to the third bottom portion 6. The bottom portion 2 typically further comprises a seat bottom opening (not shown) adjacent the elastic base 18 and sized to allow the seat bottom 27 to fit therethrough.

One or more embodiments of a bench seat cover 1 further comprise a back portion 3 coupled to the bottom portion 2. The back portion 3 is configured to cover the bench seatback 28 of the bench seat 20 when coupled thereto. More specifically, the back portion 3 comprises a first back portion 7 configured to position over or cover the first seatback 24, a second back portion 8 configured to position over or cover the second seatback 25, and a third back portion 9 configured to position over or cover the third seatback 26 when the back portion 3 is removably coupled to the seatback 28 of the bench seat 20.

The back portion 3 of the bench seat cover 1 may further comprise an elastic strip 15 coupled thereto and configured to at least partially surround the bench seatback 28 of the automobile bench seat 20 when coupled thereto. In a particular embodiment, the elastic strip 15 extends from a side of the first seatback 24, across the top of the first seatback 24, the second seatback 25, and the third seatback 26, to a side of the third seatback 26. Accordingly, the elastic strip 15 typically extends from the first back portion 7 to the second back portion 8, and from the second back portion 8 to the third back portion 9. The back portion 3 typically further comprises a seatback opening (not shown) adjacent the elastic strip 15 and sized to allow the seatback 28 to fit therethrough.

One or more embodiments of a bench seat cover 1 further comprise one or more seatbelt receiver openings 19 positioned adjacent an intersection 17 of back portion 3 and the bottom portion 2. The one or more seatbelt receiver openings 19 are sized to allow one or more seatbelt receivers 16 to extend therethrough. One or more embodiments of a bench seat cover 1 further comprise one or more headrest openings 14 positioned on a top portion 11 of the back portion 3 of the bench seat cover 1. In alternative embodiments, however, the seatbelt receivers openings 19 are not present on the bench seat cover 1. In these and other embodiments, the seatbelt receivers 16 may extend through one of the slits 10. Each headrest opening 14 is sized to allow either the headrest 13 or the arms of the headrest 13 to extend therethrough and couple to the seatback 28. In other embodiments, the back portion 3 comprises headrest coverings extending from the top portion 11 and sized to fit over and cover the headrests 13.

One or more embodiments of a bench seat cover 1 further comprise one or more slits 10 extending through the back portion 3. In some embodiments, the one or more slits extend from the top portion 11 of the back portion 3 towards the intersection 17 between the back portion 3 and the bottom portion 2. In particular embodiments, the one or more slits 10 extend from the top portion 11 to the one or more seatbelt receiver openings 19. The one or more slits 10 are operable between an open position that allows a user to pull the shoulder strap of a seatbelt therethrough and a closed position that at least partially closes the slit 10.

One or more embodiments of a bench seat cover 1 further comprise one or more couplings adjacent each of the one or more slits 10. The one or more couplings may comprise any coupling that allows the slit to be at least partially sealed or closed. In the exemplary embodiments depicted in FIGS. 1 and 2, the one or more couplings comprise hook and loop fastening material 12 coupled adjacent each slit 10. The hook and loop fastening material, such as Velcro, is positioned such that a user may open and close the respective slit 10. In other embodiments, the one or more couplings may comprise snap buttons, magnets, buttons, zippers, and the like. In some embodiments, the slit 10 does not extend to an edge of the seat cover 1, but rather makes an opening through the seat cover 1. This may simplify the installation process compared to embodiments where the slit extends all the way to an edge of the seat cover.

The particular bench seat cover 1 embodiments depicted in FIGS. 1 and 2 comprise two slits 10. A first slit 10 is positioned between the first back portion 7 and the second back portion 8, and a second slit 10 is positioned between the second back portion 8 and the third back portion 9. In such embodiments, one or more couplings are positioned adjacent the first slit 10 and are configured to removably couple the first back portion 7 to the second back portion 8. Similarly, one or more couplings are positioned adjacent the second slit 10 and are configured to removably couple the second back portion 8 to the third back portion 9.

With specific reference to FIG. 1, a bench seat cover 1 is depicted on a bench seat 20 with the two slits 10 closed. In FIG. 2, a bench seat cover 1 is depicted on a bench seat 20 with a first slit partially opened to allow a seatbelt to extend therethrough, while still being closed along a majority of the slit 10. The second slit 10 in FIG. 2 is shown in a closed position. Advantageously, the bench seat cover 1 may be adapted to bench seats 20 comprising seatbelts positioned to fit through either slit 10.

A method of removably coupling an embodiment of a bench seat cover 1 to an automobile bench seat 20 is also contemplated. In particular, a method may comprise stretching an elastic base 18 of a bottom portion 2 of the bench seat cover 1 at least partially around a first 21, second 22, and third 23 seat bottom of the automobile bench seat to cover the first 21, second 22, and third 23 seat bottoms with the bottom portion 2 of the bench seat cover 1. The method may further comprise stretching an elastic strip 15 of a back portion 3 of the bench seat cover 1 at least partially around a first 24, second 25, and third 26 seatback of the automobile bench seat 20 to cover the first 24, second 25, and third 26 seatbacks with the back portion 3 of the seatback cover 1. The method may further comprise opening one of two slits 10 extending from a top 11 of the back portion 3 toward the bottom portion 2, and pulling a seatbelt through the opened slit of the two slits 10. Closing the opened slit of the two slits behind the seat cover 1 may comprise closing the open slit of the two slits with hook and loop fastening material. The method may further comprise closing at least partially the opened slit of the two slits 10. One or more embodiments of the method may further comprise pulling two or more seatbelt receivers through two seatbelt receiver openings positioned proximate an intersection of the back portion and the bottom portion. One or more methods may further comprise extending one or more headrests through one or more headrest openings positioned on the top portion of the back portion.

It will be understood that implementations are not limited to the specific components disclosed herein, as virtually any components consistent with the intended operation of a method and/or system implementation for seat covers may be utilized. Accordingly, for example, although particular seat covers may be disclosed, such components may comprise any shape, size, style, type, model, version, class, grade, measurement, concentration, material, weight, quantity, and/or the like consistent with the intended operation of a method and/or system implementation for a seat covers may be used.

In places where the description above refers to particular implementations of seat covers, it should be readily apparent that a number of modifications may be made without departing from the spirit thereof and that these implementations may be applied to other. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An automobile bench seat cover, comprising:
   a bottom portion comprising a first bottom portion configured to position over a first seat bottom, a second bottom portion configured to position over a second seat bottom, and a third bottom portion configured to position over a third seat bottom; and
   a back portion coupled to the bottom portion and comprising:
      a first back portion configured to position over a first seatback;
      a second back portion adjacent the first back portion and configured to position over a second seatback;
      a third back portion adjacent the second back portion and configured to position over a third seatback;
      a first slit extending from a top of the back portion toward the bottom portion and operable between an open position that allows a seatbelt to extend therethrough and a closed position closes the first slit, the first slit dividing the first back portion from the second back portion;
      one or more first couplings positioned adjacent the first slit and configured to removably couple the first back portion to the second back portion when the first slit is in the closed position;
      a second slit extending from the top of the back portion toward the bottom portion and operable between an open position that allows a seatbelt to extend therethrough and a closed position that closes the second slit, the second slit dividing the second back portion from the third back portion, wherein at least one of the first and second slits is positioned to align with a seatbelt of an automobile bench seat; and
      one or more second couplings positioned adjacent the second slit and configured to removably couple the second back portion to the third back portion when the second slit is in the closed position.

2. The automobile bench seat cover of claim 1, wherein the one or more first couplings and the one or more second couplings each comprise hook and loop fastening material.

3. The automobile bench seat cover of claim 2, further comprising:
   a first seatbelt receiver opening positioned proximate an intersection of the back portion and the bottom portion and aligned with the first slit, wherein the first slit extends from the top portion of the back portion to the first seatbelt receiver opening; and
   a second seatbelt receiver opening positioned proximate the intersection of the back portion and the bottom portion and aligned with the second slit, wherein the second slit extends from the top portion of the back portion to the second seatbelt receiver opening.

4. The automobile bench seat cover of claim 3, further comprising one or more headrest openings positioned on the top portion of the back portion.

5. The automobile bench seat cover of claim 4, further comprising an elastic strip on the bottom portion configured to stretch around portions of the first, second and third seat bottoms to removably couple the bottom portion of the seat cover to the first, second, and third seat bottoms.

6. The automobile bench seat cover of claim 5, further comprising an elastic strip on the back portion configured to stretch around portions of the first, second, and third seatbacks to removably couple the back portion of the seat cover to the first, second, and third seatbacks.

\* \* \* \* \*